(12) United States Patent
Trunk et al.

(10) Patent No.: US 9,059,655 B2
(45) Date of Patent: Jun. 16, 2015

(54) METHOD FOR FAULT RECOGNITION IN AN ELECTRIC MACHINE CONTROLLED BY AN INVERTER IN A MOTOR VEHICLE AND DEVICE FOR MONITORING AN OPERATION OF THE ELECTRIC MACHINE

(75) Inventors: Martin Trunk, Moeglingen (DE); Alexander Becker, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 357 days.

(21) Appl. No.: 13/517,922

(22) PCT Filed: Nov. 4, 2010

(86) PCT No.: PCT/EP2010/066785
§ 371 (c)(1),
(2), (4) Date: Oct. 26, 2012

(87) PCT Pub. No.: WO2011/085837
PCT Pub. Date: Jul. 21, 2011

(65) Prior Publication Data
US 2013/0041554 A1    Feb. 14, 2013

(30) Foreign Application Priority Data

Dec. 21, 2009   (DE) .......................... 10 2009 055 055

(51) Int. Cl.
| G01M 17/00 | (2006.01) |
| --- | --- |
| H02P 29/02 | (2006.01) |
| B60L 3/00 | (2006.01) |
| B60L 11/14 | (2006.01) |
| H02M 1/32 | (2007.01) |

(52) U.S. Cl.
CPC .............. *H02P 29/02* (2013.01); *B60L 3/0061* (2013.01); *B60L 11/14* (2013.01); *B60L 2240/36* (2013.01); *B60L 2240/423* (2013.01); *H02M 1/32* (2013.01); *Y02T 10/642* (2013.01); *Y02T 10/7077* (2013.01); *Y02T 10/70* (2013.01)

(58) Field of Classification Search
CPC ........ B60T 8/885; B60T 17/221; G06F 11/30
USPC ......... 701/34.1, 1; 318/434; 361/30; 477/107
See application file for complete search history.

(56) References Cited

U.S. PATENT DOCUMENTS

| 6,359,405 B1 * | 3/2002 | Tsurumi ....................... 318/434 |
| 7,471,003 B2 * | 12/2008 | Kobayashi et al. ......... 290/40 C |
| 7,607,827 B2 * | 10/2009 | Karikomi et al. ............. 374/141 |
| 7,904,254 B2 * | 3/2011 | Ibori et al. ....................... 702/34 |
| 8,045,301 B2 * | 10/2011 | Shiba et al. ..................... 361/23 |

(Continued)

FOREIGN PATENT DOCUMENTS

| DE | 10 2006 003 254 | 7/2007 |
| DE | 10 2007 020 509 | 11/2008 |

(Continued)

*Primary Examiner* — Helal A Algahaim
*Assistant Examiner* — Shardul Patel
(74) *Attorney, Agent, or Firm* — Kenyon & Kenyon LLP

(57) ABSTRACT

A method for fault recognition in an electric machine controlled by an inverter in a motor vehicle, in which the phase currents of the electric machine are ascertained, in particular ascertained by measuring, and a fault is recognized if at least one of the phase currents or a variable derived therefrom, exceeds a predefined upper threshold value, the upper threshold value being established as a function of operating parameters of the motor vehicle, in particular of the electric machine and/or of the inverter.

14 Claims, 3 Drawing Sheets

(56) References Cited

U.S. PATENT DOCUMENTS

| | | | |
|---|---|---|---|
| 8,369,049 B2* | 2/2013 | Kuehner et al. | 361/3 |
| 2005/0204761 A1* | 9/2005 | Karikomi et al. | 62/228.1 |
| 2007/0093359 A1* | 4/2007 | Kobayashi et al. | 477/107 |
| 2007/0093369 A1 | 4/2007 | Bocchicchio | |
| 2009/0251831 A1* | 10/2009 | Shiba et al. | 361/30 |

FOREIGN PATENT DOCUMENTS

| | | |
|---|---|---|
| EP | 105 0 425 | 11/2000 |
| EP | 198 3 640 | 10/2008 |
| JP | 111 92 926 | 7/1999 |
| JP | 2006 129567 | 5/2006 |

* cited by examiner

METHOD FOR FAULT RECOGNITION IN AN ELECTRIC MACHINE CONTROLLED BY AN INVERTER IN A MOTOR VEHICLE AND DEVICE FOR MONITORING AN OPERATION OF THE ELECTRIC MACHINE

FIELD OF THE INVENTION

The present invention relates to a method for fault recognition in an electric machine controlled by an inverter in a motor vehicle and a device for monitoring an operation of an electric machine controlled by an inverter in a motor vehicle.

BACKGROUND INFORMATION

Electric machines are used, for example, in hybrid vehicles, where they are operated either in the motor mode or in the generator mode. In the motor mode, the electric machine generates an additional drive torque, which supports an internal combustion engine, for example, in an acceleration phase; in the generator mode, it generates electrical energy, which is stored in an energy storage device such as a battery or a super-cab. The operating mode and power of the electric machine are set with the aid of an inverter.

Since in hybrid motor vehicles relatively high currents and voltages must be provided in order to be able to use the electric machine as a motor for driving the motor vehicle, operating parameters such as the phase currents of the electric machine are constantly monitored in order to protect the electrical system and the components connected to the electrical system.

When a malfunction, for example, a phase overcurrent, is recognized, the pulse-controlled inverter is switched into a safe state in order to prevent possible damage to the electrical components. Essentially two different switch-off methods are known from the related art. In a first method, all switches connected to a low potential (low-side switches) of the pulse-controlled inverter are closed and all switches connected to a high potential (high-side switches) of the pulse-controlled inverter are open. This operating mode is also referred to as short-circuit mode. In another switch-off method, all switches of the pulse-controlled inverter are open. This is also referred to as isolation mode.

A method is discussed in DE 10 2006 003 254 A1 for switching off an electric machine using pulse-controlled inverters in the event of a fault provides for minimizing undesirable side effects when switching off the electric machine and maximizing the regular machine operation by switching the electric machine first into an isolation mode, in which all switches of the pulse-controlled inverter are open, and subsequently into a short-circuit mode, in which the switches connected to the high potential are open and the switches connected to the low potential are closed.

A method for handling a fault in electric machines of a hybrid drive is discussed in DE 10 2007 020 509 A1 in which it is initially detected whether at least one operating parameter of the electric machine is greater than an associated operating parameter limiting value. If it is detected that at least one operating parameter is greater than the associated limiting value, a supply connection of the electric machine is activated for a time interval associated with the operating parameter and the supply connection is short-circuited to ground after the elapse of the time interval.

SUMMARY OF THE INVENTION

The method according to the present invention for fault detection in an electric machine controlled by an inverter in a motor vehicle provides that the phase currents of the electric machine are ascertained and a fault is recognized if at least one of the phase currents or a variable derived therefrom exceeds a predefined upper threshold value. According to the exemplary embodiments and/or exemplary methods of the present invention, the upper threshold value is established as a function of operating parameters of the motor vehicle, in particular of the electric machine and/or of the inverter. All phase currents of the electric machine are advantageously ascertained by measuring. Alternatively, however, the phase currents may also be partially ascertained by calculation.

Changing the upper threshold value as a function of operating parameters of the motor vehicle allows, on the one hand, the inverter, in particular the power components of the inverter, often also referred to as power semiconductors, to better protect itself. On the other hand, the operating limits of the inverter defined by the power components of the inverter may be extended according to the situation. Furthermore, the exemplary embodiments and/or exemplary methods of the present invention allow the maximally occurring phase current to be limited as a function of the operating point. Since the phase current directly affects the torque-forming variables of the electric machine, the operating reliability of the motor vehicle may also be increased in this way.

According to one specific embodiment of the present invention, a fault is diagnosed also if at least one of the variables derived from the phase currents is less than a predefined lower threshold value. The lower threshold value is established as a function of operating parameters of the motor vehicle, in particular of the electric machine and/or of the inverter. As an alternative to the direct comparison of the phase currents to the current threshold values, it is also possible to initially convert the phase currents into an appropriate other variable, such as a voltage, and then to compare the corresponding voltages to a voltage threshold value. Phase currents $I_U$, $I_V$, and $I_W$ may be mapped, for example, to the corresponding voltage values in a voltage interval of 0 V to 5 V. For the motor mode of electric machine 1, the voltage threshold value may be established, for example, in such a way that it is exactly in the middle of the voltage interval, i.e., at 2.5 V. However, in this case, for the generator mode of the electric machine, in addition to an upper threshold value for a positive half-wave of the phase current, a lower threshold value, having a different absolute value, also results for a negative half-wave of the phase current. In order to take full advantage of the above-named advantages, it is expedient to establish also the lower threshold value as a function of the operating point.

Another specific embodiment of the present invention provides that the upper and/or the lower threshold value(s) is/are selected from a set of stored threshold values. The storage of multiple predefined threshold values and the selection of an instantaneously valid threshold value as a function of the operating point may be implemented in a particularly simple manner and using little hardware or software complexity.

According to another specific embodiment of the present invention, the upper and/or the lower threshold value(s) is/are established as a function of an operating state of the electric machine.

During the operation of the inverter in the power limiting ranges, the following limiting factors essentially exist, without taking into account service life effects:

a maximally allowable overvoltage $U_{schalt}$ when switching a power switching element of the inverter, referred to in the following as switching overvoltage, a maximum phase current, which results in demagnetization of the permanent magnets of the electric machine, and the thermal conditions of the inverter itself, which directly correlate with the phase currents.

Voltage $U_{Ih}$ applied to a power switching element in an inverter results from the sum of an instantaneous intermediate circuit voltage $U_{zk}$ and switching overvoltage $U_{schalt}$. In order to avoid damage to the power switching element or the power semiconductor, voltage $U_{Ih}$ applied to the power switching element must always be smaller than a maximum voltage $U_{max}$.

Thus, $$U_{zk} + U_{schalt} = U_{Ih} < U_{max} \quad (1)$$

Furthermore, switching overvoltages $U_{schalt}$ across the power switching elements of the inverter are directly proportional to the particular switched phase currents $I_{phase}$, so that:

$$U_{schalt} \sim I_{phase} \quad (2)$$

Thus, voltage $U_{Ih}$ applied to the power switching element is essentially determined by intermediate circuit voltage $U_{zk}$ and phase current $I_{phase}$. Due to the internal resistance of the high-voltage battery and its leads, however, a significantly higher intermediate circuit voltage is applied to the power switching elements of the inverter in generator mode of the electric machine than in the motor mode. Consequently, in the motor mode a significantly higher phase current may be allowed than in the generator mode of the electric machine. In order to make the best possible use of the operating range of the inverter, it is therefore expedient to establish the upper and/or the lower threshold value(s) as a function of the operating state of the electric machine, i.e., at least to provide different threshold values for the generator and the motor modes.

A particularly simple possibility of taking into account the operating state of the electric machine is to take into account intermediate circuit voltage $U_{zk}$. Therefore, one specific embodiment of the present invention provides that the upper and/or the lower threshold value(s) be established as a function of intermediate circuit voltage $U_{zk}$. In this case, in particular, the upper threshold value decreases with increasing intermediate circuit voltage $U_{zk}$, while the lower threshold value may increase. Accordingly, in the event of decreasing intermediate circuit voltage $U_{zk}$, the upper threshold value increases, while the lower threshold value may decrease.

According to another specific embodiment of the present invention, the upper and/or the lower threshold value(s) is/are established as a function of a temperature, in particular the junction temperature, of a power component subject to electrical breakthrough, in particular of a power switching element, of the inverter.

Since in power components subject to breakthrough, such as power switching elements or also diodes in an inverter, the blocking voltages of the components depend on the temperature of the particular component, it is advantageous to establish the allowable phase current as a function of the temperature at these components. In this case, in particular, the upper threshold value decreases with increasing component temperature, while the lower threshold value may increase. Accordingly, the upper threshold value increases with decreasing component temperature, while the lower threshold value may decrease. Of special significance is the junction temperature of the power switching elements.

According to one specific embodiment of the present invention, the upper and/or the lower threshold value(s) is/are established as a function of the intensity of the phase currents and/or as a function of the flow times of the phase currents.

Both the intensity of the phase currents and their flow times, i.e., the time period during which a phase current flows, affect the power loss across the power switching elements of the inverter. In order to take full advantage of the operating range of the inverter on the one hand, and to reliably avoid damage to the power components on the other hand, it is expedient to establish limiting values for the phase currents as a function of the intensity and flow time of the phase currents. In this case, in particular, the upper threshold value decreases with increasing current intensity and/or increasing flow time, while the lower threshold value may increase. Accordingly, the upper threshold value increases with decreasing current intensity and/or decreasing flow time, while the lower threshold value may decrease.

Furthermore, the upper and/or the lower threshold value(s) may also be established as a function of a collector-emitter voltage or a source-drain voltage of a power switching element of the inverter, as a function of a temperature of a heat sink of a power component of the inverter, in particular of a power switching element, or also as a function of a collector current or a source current of a power switching element of the inverter. All these variables affect the thermal conditions at the power components, which are subject to breakthrough, of the inverter and therefore affect the phase currents still allowable under the particular conditions. The intrinsic reliability of the inverter may thus be increased, while the maximally possible phase currents are utilized as a function of the operating point by taking into account these operating parameters.

In addition, the exemplary embodiments and/or exemplary methods of the present invention provide a device for monitoring an operation of an electric machine controlled by an inverter in a motor vehicle, having a phase current monitoring device for comparing phase currents or variables derived therefrom of the electric machine to a predefined upper threshold value, and a control unit for establishing the upper threshold value as a function of operating parameters of the motor vehicle, in particular of the electric machine and/or of the inverter.

The control unit may be implemented as a standalone unit, for example in the form of a microcontroller, or in the form of a hardware circuit.

The phase current monitoring device may also compare a variable derived from the phase currents to a lower threshold value, and the control unit may establish the lower threshold value as a function of operating parameters of the motor vehicle, in particular of the electric machine and/or of the inverter. The device according to the present invention is basically configured in such a way that it is capable of carrying out the method according to the present invention, including all specific embodiments.

Further features and advantages of specific embodiments of the present invention result from the description that follows with reference to the appended figures.

DETAILED DESCRIPTION

Figure 1:
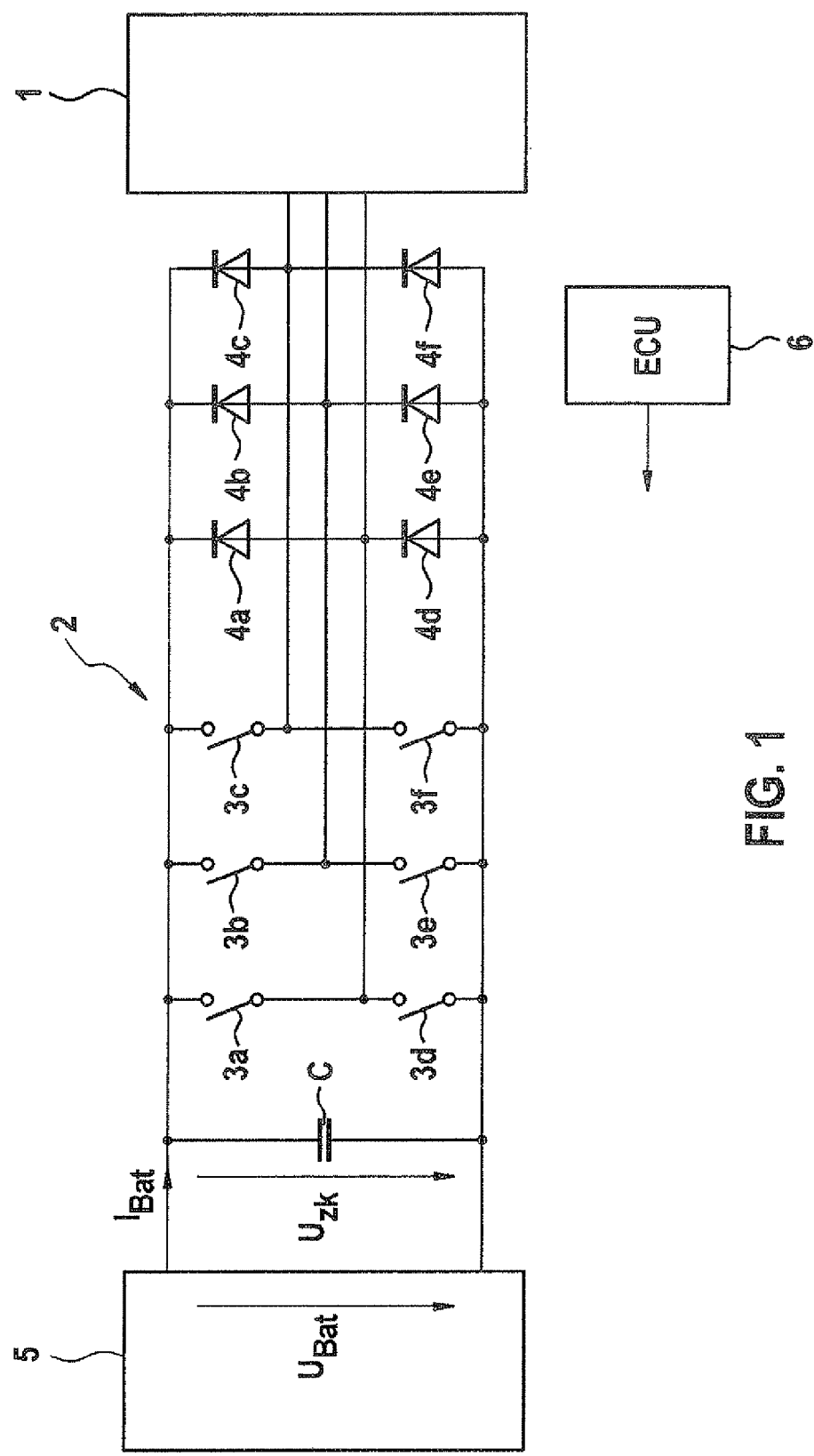
FIG. 1 shows a schematic illustration of a three-phase electric machine controlled by an inverter.

FIG. 1 shows a schematic illustration of an electric machine 1 having an inverter connected thereto in the form of a pulse-controlled inverter 2. Pulse-controlled inverter 2 includes multiple power components—often referred to as power semiconductors—in the form of power switching elements 3a through 3f, which are connected to individual phases U, V, W of electric machine 1 and connect phases U, V, W either to a high supply potential (battery voltage $U_{Bat+}$) or a low supply potential ($U_{Bat-}$). Power switching elements 3a through 3c connected to high supply potential $U_{Bat+}$ are also referred to as "high-side switches," and power switching elements 3d through 3f connected to low supply potential $U_{Bat-}$ are referred to as "low-side switches." Pulse-controlled inverter 2 also further includes power components in the form of freewheeling diodes 4a through 4f, which in the illustrated exemplary embodiment are situated in the form of a six-pulse rectifier bridge circuit. Each diode 4a through 4f is connected in parallel to one of power switching elements 3a through 3f. The power switching elements may, for example, be designed as IGBTs (Insulated Gate Bipolar Transistors) or as MOSFETs (Metal Oxide Semiconductor Field-effect Transistors).

Pulse-controlled inverter 2 determines the power and the mode of operation of electric machine 1 and is controlled accordingly by a control unit 6. Electric machine 1 may thus be operated either in the motor mode or in the generator mode. In the motor mode, it generates an additional drive torque, which supports the internal combustion engine, for example, in an acceleration phase. In contrast, in the generator mode, mechanical energy is converted into electrical energy and stored in an energy storage device, here in a battery 5. Battery 5 is connected to a power supply system (not illustrated) in a motor vehicle; the battery may be designed as a high-voltage battery, and the power supply system may be designed as a high-voltage traction system in a hybrid vehicle, for example.

A so-called intermediate circuit capacitor C, which is essentially used for stabilizing battery voltage $U_{Bat}$ and to which an intermediate circuit voltage $U_{zk}$ is applied, is situated in parallel to pulse-controlled inverter 2.

Figure 4:
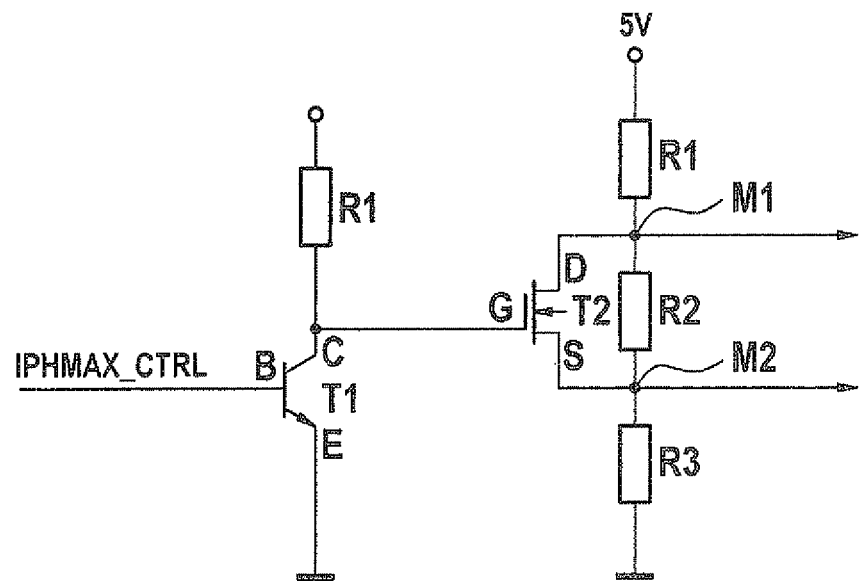
FIG. 4 shows a schematic illustration of a circuit configuration in a phase current monitoring device for establishing a lower and an upper voltage threshold value according to one specific embodiment of the present invention.

Phase currents $I_U$, $I_V$, and $I_W$ in phases I, U, and W of electric machine 1 are ascertained with the help of current sensors (cf., FIG. 4). All phase currents $I_U$, $I_V$, and $I_W$ are advantageously ascertained by measuring. However, as an alternative, it is also possible to measure only part of the phase currents via current sensors and to ascertain the remaining phase currents mathematically.

For the self-protection of electric machine 1 and of pulse-controlled inverter 2 it is necessary to monitor phase currents $I_U$, $I_V$, and $I_W$ and to transfer pulse-controlled inverter 2 to a safe operating state if at least one of phase currents $I_U$, $I_V$, or $I_W$ exceeds a predefined threshold value, often also referred to as overcurrent threshold. If a malfunction is recognized in the form of an excessively high current in at least one of phases U, V, or W, pulse-controlled inverter 2, triggered by control unit 6, automatically switches into an isolation mode or short-circuit mode.

Figure 2:
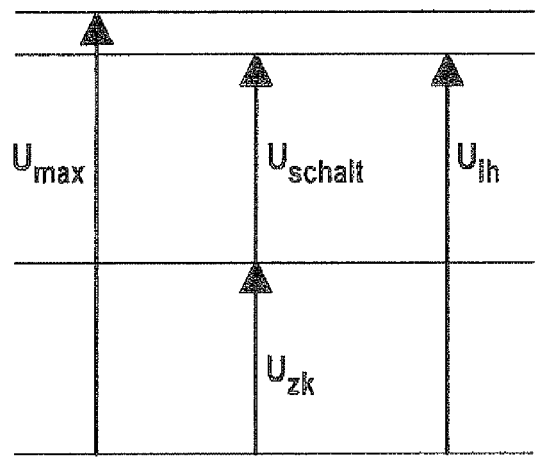
FIG. 2 shows a schematic illustration of the voltage components on a power switching element of an inverter.

Within pulse-controlled inverter 2, the power components subject to breakthrough, and in particular power switching elements 3a through 3f, are particularly voltage-sensitive. A voltage $U_{th}$ across a power switching element 3 results as a sum of an intermediate circuit voltage $U_{zk}$ across intermediate circuit capacitor C and a switching overvoltage $U_{schalt}$ (see FIG. 2). In order to avoid permanent damage to the power switching elements, voltage $U_{th}$ applied to the power switching element must always be smaller than a maximum voltage U. Switching overvoltage $U_{schalt}$ directly depends on the particular phase current. If phase currents $I_U$, $I_V$, and $I_W$ are compared to one single fixedly predefined overcurrent value, the latter must be established with reference to the highest possible intermediate circuit voltage $U_{zk}$ and the resulting maximally allowable switching overvoltage $U_{schalt}$. However, a response to a decrease in intermediate circuit voltage $U_{zk}$ is no longer possible, so that the operating range of pulse-controlled inverter 2 in operating situations of this type is not optimally utilized.

According to the exemplary embodiments and/or exemplary methods of the present invention, an upper threshold value for phase currents $I_U$, $I_V$, and $I_W$ is established as a function of operating parameters of the motor vehicle, in particular of electric machine 1 and/or of pulse-controlled inverter 2. In this way, it is possible to establish as a function of the operating point the maximally allowable phase current, i.e., the maximally possible phase current not resulting in the destruction of power switching elements 3 and thus to significantly extend the operating range of pulse-controlled inverter 2.

Due to the internal resistance of battery 5 and its leads, a significantly higher intermediate circuit voltage $U_{zk}$ results in the generator mode of electric machine 1 than in the motor mode. Consequently, significantly higher switching overvoltages $U_{schalt}$ and thus significantly higher phase currents $I_U$, $I_V$, and $I_W$ may be allowed in the motor mode than in the generator mode. If the upper limiting value of the phase current is established as a function of the operating mode of electric machine 1 or as a function of intermediate circuit voltage $U_{zk}$, which, among other things, also characterizes the operating mode, the operating range of pulse-controlled inverter 2, in particular in the motor mode of electric machine 1, may be substantially extended.

Figure 3:
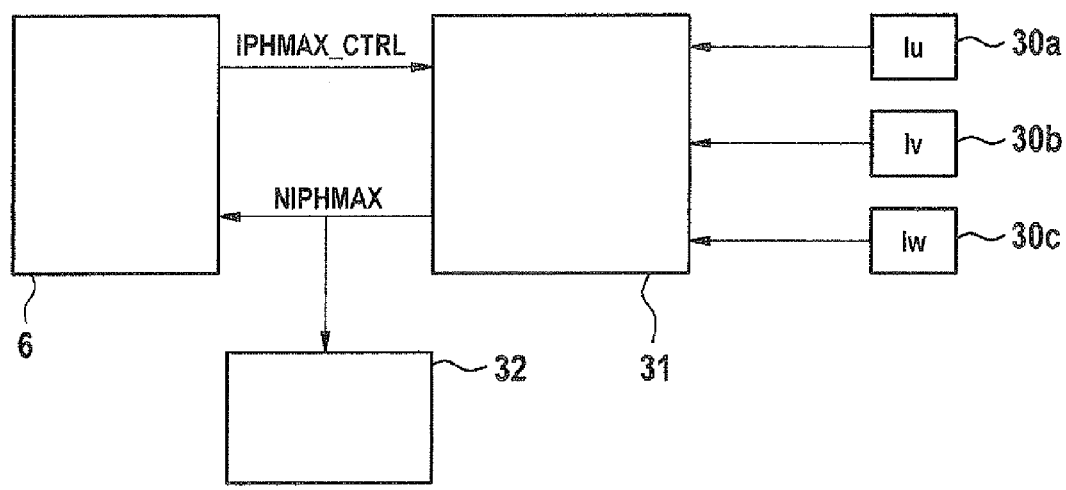
FIG. 3 shows a schematic block diagram of a device according to the present invention for monitoring an operation of an electric machine controlled by an inverter.

FIG. 3 shows a schematic block diagram of a device according to the present invention for monitoring an operation of an electric machine controlled by an inverter. A phase current monitoring device 31 is connected between control unit 6, which controls pulse-controlled inverter 2, and current sensors 30a through 30c, which detect phase currents $I_U$, $I_V$, and $I_W$. Phase currents $I_U$, $I_V$, and $I_W$ are compared to a predefined upper threshold value by phase current monitoring device 31, for example, with the aid of comparators. If at least one of phase currents $I_U$, $I_V$, or $I_W$ exceeds the upper threshold value, a fault is recognized and reported to control unit 6 and to a fault logic 32 in the form of a signal NIPHMAX. The fault logic is illustrated in FIG. 3 as a standalone unit, but it may also be integrated into control unit 6. Fault logic 32 and/or control unit 6 then transfer(s) pulse-controlled inverter 2 into a safe operating state in the form of a freewheel or a short-circuit. According to the present invention, control unit 6 transmits to phase current monitoring device 31a control signal IPHMAX-CTRL, with the help of which the upper threshold value is established. Multiple upper threshold values are advantageously stored in phase current monitoring device 31, from which an instantaneously valid threshold value is selected as a function of control signal IPHMAX-CTRL. In this way, the upper threshold value may be established as a function of the operating point.

If only two different upper threshold values, for example, for the generator mode and the motor mode of electric machine 1, are provided, control signal IPHMAX-CTRL may be implemented, for example, in the form of a simple logic signal, which may assume the "high" or the "low" levels. The transmission of a low level, for example, results in setting a first upper threshold value for the motor mode, and the transmission of a high level results in setting a second upper threshold value for the generator mode. If more than two upper threshold values are provided, multiple control signals IPHMAX-CTRL of this type may be provided. As an alternative, the control signal may, however, also be implemented in the form of a pulse-width modulated signal or of an analog signal.

As an alternative to the direct comparison of phase currents $I_U$, $I_V$, and $I_W$ to the current threshold values, it is also possible to initially convert phase currents $I_U$, $I_V$, and $I_W$ into an appropriate other variable, such as a voltage, and then to compare the corresponding voltages to a voltage threshold value. Phase currents $I_V$, $I_V$, and $I_W$ may be mapped, for example, to the corresponding voltage values in a voltage interval of 0 V to 5 V. For the motor mode of electric machine 1, the voltage threshold value may be established, for example, in such a way that it is exactly in the middle of the voltage interval, i.e., at 2.5 V. However, in this case, for the generator mode of electric machine 1, in addition to an upper threshold value for a positive half-wave of the phase current, a lower threshold value, having a different absolute value, also results for a negative half-wave of the phase current. According to one specific embodiment of the present invention, this lower threshold value is also established as a function of the operating point.

FIG. 4 shows a schematic illustration of a circuit configuration in a phase current monitoring device 31 for establishing a lower and an upper voltage threshold value according to one specific embodiment of the present invention. Control signal IPHMAX-CTRL is applied to a base terminal of a first transistor T1. A collector terminal of first transistor T1 is connected via a pull-up resistor R1 to a gate terminal of a second transistor T2, designed in the illustrated specific embodiment as a field-effect transistor T2. A voltage divider, which is formed by a series connection of three resistors R1, R2, and R3 [R1, R2, and R3 according to the figure], is connected downstream from second transistor T2. A drain terminal of second transistor T2 is connected to a first center tap M1 between first resistor R1 and second resistor R2 [R1 and R2 according to the figure] of the voltage divider, and a source terminal of second transistor T2 is connected to a second center tap M2 between second resistor R2 and third resistor R3 [R2 and R3 according to the figure]. The upper threshold value for a voltage corresponding to the phase current is collected at first central tap M1. The lower threshold value for a voltage corresponding to the phase current is collected at second center tap M2.

As soon as control signal IPHMAX-CTRL assumes a value of 0 V (low level) in the case of a motor mode of electric machine 1, second transistor T2 is switched on via first transistor T1 and pull-up resistor R1. A voltage ratio of 1:1 is thus established across the voltage divider, so that the upper and the lower threshold values for the positive and the negative half-waves of the phase current coincide in a value of 2.5 V, for example. If control signal IPHMAX-CTRL has a high level, second transistor T2 is closed, so that different voltage values result for the upper and the lower threshold values. In the case of a positive half-wave, the upper threshold value must not be exceeded, and in the case of a negative half-wave, the voltage value must not drop below the lower threshold value. The circuit illustrated in FIG. 4 thus represents a particularly simple and cost-effective implementation of a phase current monitoring device 31, which is suitable for setting the upper and the lower threshold values for the phase currents if phase currents $I_U$, $I_V$, and $I_W$ are converted into the corresponding voltages prior to the comparison to the threshold values.

Figure 5:
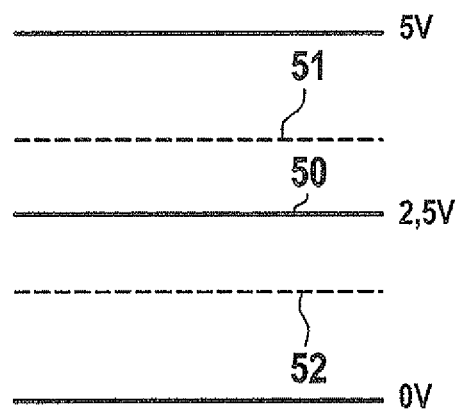
FIG. 5 shows a schematic illustration of the voltage threshold values established with the aid of a circuit configuration according to FIG. 4.

FIG. 5 shows a schematic illustration of the voltage threshold values established with the aid of a circuit configuration according to FIG. 4. The upper threshold value for the motor mode, which in the selected specific embodiment coincides with the lower threshold value for the motor mode, is labeled using reference numeral 50. The upper and the lower threshold values for the generator mode are illustrated as dashed lines 51 and 52, respectively. Threshold values 51 and 52 are symmetrical with respect to mean value 2.5 V and characterize a phase current of +m amperes for a positive half-wave and −m amperes for a negative half-wave of the phase current.

In addition to intermediate circuit voltage $U_{zk}$ and the operating mode of electric machine 1, other influencing factors include the junction temperatures of power switching elements 3a through 3f, the intensities and the flow times of phase currents $I_U$, $I_V$, and $I_W$, the collector-emitter voltages or source-drain voltages of power switching elements 3a through 3f, the temperatures at the heat sinks of power switching elements 3a through 3f, or also collector currents or source currents of power switching elements 3a through 3f, the power losses and/or the thermal conditions at power switching elements 3a through 3f, and thus the maximally allowable phase currents $I_U$, $I_V$, and $I_W$. In order to make the best possible use of the operating range of pulse-controlled inverter 2, it is therefore advantageous to also take these operating parameters into account when establishing the upper threshold value and, if necessary, also the lower threshold value.

The exemplary embodiments and/or exemplary methods of the present invention are described with reference to a three-phase electric machine, but, of course, it is also applicable to electric machines having more or fewer than three phases.

What is claimed is:

1. A method for providing fault recognition in an electric machine, controlled by an inverter in a motor vehicle, the method comprising:
   ascertaining the phase currents of the electric machine by measuring; and
   recognizing a fault, via a control unit, if at least one of the phase currents or a variable derived therefrom exceeds a predefined upper threshold value;
   wherein the upper threshold value is established as a function of operating parameters of the motor vehicle, including at least one of the electric machine and the inverter, and
   wherein a control signal is applied to a base terminal of a first transistor, the collector terminal of which is connected to a gate terminal of a second transistor via a pull-up resistor, a potential divider which is formed from a series connection of three resistors being connected downstream of the second transistor, wherein a drain terminal of the second transistor is connected to a first center tap between the first resistor and the second resistor of the potential divider, wherein the upper threshold value for a voltage corresponding to the phase current is tapped at the first center tap.

2. The method of claim 1, wherein a fault is recognized if at least one of the phase currents or a variable derived therefrom is less than a predefined lower threshold value, the lower threshold value being established as a function of operating parameters of the motor vehicle, including at least one of the electric machine and the inverter.

3. The method of claim 1, wherein the upper and/or the lower threshold value(s) is/are selected from a set of stored threshold values.

4. The method of claim 1, wherein the upper and/or the lower threshold value(s) is/are established as a function of an operating state of the electric machine.

5. The method of claim 1, wherein the upper and/or the lower threshold values value(s) is/are established as a function of an intermediate circuit voltage.

6. The method of claim 1, wherein the upper and/or the lower threshold value(s) is/are established as a function of a temperature, including the junction temperature, of a power component subject to electrical breakthrough, including a power switching element, and of the inverter.

7. The method of claim 1, wherein the upper and/or the lower threshold value(s) is/are established as a function of the intensity of the phase currents and/or as a function of the flow times of the phase currents.

8. The method of claim 1, wherein the upper and/or the lower threshold value(s) is/are established as a function of a collector-emitter voltage or a source-drain voltage of a power switching element of the inverter.

9. The method of claim 1, wherein the upper and/or the lower threshold value(s) is/are established as a function of a temperature of a heat sink of a power component, including a power switching element of the inverter.

10. The method of claim 1, wherein the upper and/or the lower threshold value(s) is/are established as a function of a collector current or a source current of a power switching element of the inverter.

11. The method of claim 1, wherein the inverter is a pulse-controlled inverter, and if the fault is recognized, the inverter is transferred into a safe operating state in the form of a freewheel-circuit or a short-circuit.

12. A device for monitoring an operation of an electric machine controlled by an inverter in a motor vehicle, comprising:
  a phase current monitoring device for comparing the phase currents or variables of the electric machine derived therefrom, having a predefined upper threshold value; and
  a control unit for establishing the upper threshold value as a function of operating parameters of the motor vehicle, including the electric machine and/or the inverter, and
  wherein the phase-current monitoring device has a first transistor, a second transistor, a pull-up resistor and a potential divider which is formed from a series connection of three resistors and is connected downstream of the second transistor, wherein the first transistor has a collector terminal which is connected to a gate terminal of a second transistor via a pull-up resistor, wherein a drain terminal of the second transistor is connected to a first center tap between the first resistor and the second resistor of the potential divider, and wherein the control unit is configured to apply a control signal to a base terminal of the first transistor.

13. The device of claim 12, wherein the phase current monitoring device compares variables derived from the phase currents to a lower threshold value, and the control unit establishes the lower threshold value as a function of operating parameters of the motor vehicle, including the electric machine and/or the inverter.

14. The device of claim 12, wherein the inverter is a pulse-controlled inverter, and if the fault is recognized, the inverter is transferred into a safe operating state in the form of a freewheel-circuit or a short-circuit.

\* \* \* \* \*